United States Patent [19]
Barkes

[11] Patent Number: 5,477,884
[45] Date of Patent: Dec. 26, 1995

[54] MIXING VALVE FOR AN AIRCRAFT CLEANING APPARATUS

[75] Inventor: Jeffrey C. Barkes, Jonesboro, Ga.

[73] Assignee: Pure Corporation, Indianapolis, Ind.

[21] Appl. No.: 188,100

[22] Filed: Jan. 28, 1994

[51] Int. Cl.⁶ .................................................. F16K 11/02
[52] U.S. Cl. ..................... 137/625.41; 137/607; 251/120
[58] Field of Search ........................... 137/625.41, 607, 137/625.46; 251/120

[56] References Cited

U.S. PATENT DOCUMENTS

| | | |
|---|---|---|
| 1,896,092 | 2/1933 | Mangiameli ................... 137/625.41 X |
| 2,809,663 | 10/1957 | Farwick, Sr. ........................ 137/625.41 |
| 4,087,967 | 5/1978 | Knapp . |
| 4,726,526 | 2/1988 | Ostergaard . |
| 4,773,113 | 9/1988 | Russell . |
| 4,967,960 | 11/1990 | Futrell . |
| 4,991,776 | 2/1991 | Smith . |
| 5,057,214 | 10/1991 | Morris . |
| 5,069,245 | 12/1991 | Potter . |
| 5,161,753 | 11/1992 | Vice et al. . |
| 5,273,059 | 12/1993 | Gross et al. . |

FOREIGN PATENT DOCUMENTS 744066 2/1956 United Kingdom ................... 251/120

*Primary Examiner*—John C. Fox
*Attorney, Agent, or Firm*—Bose McKinney & Evans

[57] ABSTRACT

A valve system for mixing two pressurized liquids, A and B, in varying proportions ranging from 0% liquid A, 100% liquid B to 100% liquid A, 0% liquid B comprises two liquid inlet passages, a mixture outlet passage, and a spool valve disposed therebetween for directing the desired proportions of liquid to the outlet passage. The liquid proportions are adjusted by rotating the spool valve between two predetermined stops thereby allowing incoming fluids to flow at different rates into offset bores extending through the spool valve. Such a valve system is useful in vehicle and aircraft cleaning systems wherein one liquid comprises a soap solution and the other comprises water.

14 Claims, 4 Drawing Sheets

MIXING VALVE FOR AN AIRCRAFT CLEANING APPARATUS

BACKGROUND OF THE INVENTION

This invention relates in general to mixing valves for combining fluids from two separate sources into one mixture, and more specifically to a mixing valve for an aircraft cleaning apparatus having two inlets A and B, and one outlet, wherein the outlet mixture comprises a solution ranging from 0% inlet A fluid, 100% inlet B fluid to 100% inlet A fluid, 0% inlet B fluid.

Pressurized cleaning apparatuses are well known and comprise many different forms. For example, a garden hose connected to a typical household faucet may be used to provide a source of pressurized "tap" water for a variety of cleaning needs. In order applications, such as a public car wash, a mechanism is provided for selecting pressurized water only, or a predetermined mixture of pressurized water and a concentrate such as soap or wax. A smaller vehicle cleaning system which operates on this principal is disclosed in U.S. Pat. No. 4,967,960. Likewise, a drain cleaning apparatus operating in this manner is disclosed in U.S. Pat. No. 4,773,113. A Larger system employing this principal for cleaning commercial aircraft is disclosed in U.S. Pat. No. 5,161,753.

In many of the cleaning apparatus previously described, some type of valve apparatus is employed to allow one fluid to intermix with another fluid, thereby providing a solution of predetermined concentration. Such a system using an aspirator-transfer valve is shown in U.S. Pat. No. 4,726,526. Other valve configurations, such as that shown in U.S. Pat. No. 5,069,245, permit the mixing together of two liquids according to plurality of predetermined proportion settings.

In the commercial airline industry, aircraft are typically cleaned extensively on a yearly basis by "teams" of airline employees. Such a task usually involves the use of a variety of cleaning agents and bulky cleaning machinery. It would therefore be desirable provide a stand-alone cleaning apparatus that would allow multiple users to accomplish specific cleaning task without disrupting the other members of the team. It would further be desirable to provide each user with complete control over the strength of the particular cleaning solution being used. Such a system must therefore be capable of providing a constant pressure cleaning solution to each user wherein the cleaning agent to water ratio is continuously adjustable.

SUMMARY OF THE INVENTION

The present invention meets the aforementioned objectives by providing a mixing valve having a valve body, a first inlet passage defined in the body for receiving a first fluid at a first predetermined pressure, a second inlet passage also defined in the body for receiving a second fluid at a second predetermined pressure, an outlet passage defined in the body for providing a proportional mixture of the two fluids, and a valve means disposed within the body for directing the two fluids toward the outlet passage. The valve means is adjustable to permit the mixture to range, analog fashion, between a proportion of about 0% first fluid, 100% second fluid to about 100% second fluid, 0% first fluid.

These and other objects of the present invention will become more apparent from the following description of the preferred embodiment.

BRIEF DESCRIPTION OF THE DRAWINGS

FIG. 4 is a bottom plan view of the valve body shown in FIG. 1a.

DESCRIPTION OF THE PREFERRED EMBODIMENT

Figure 1:
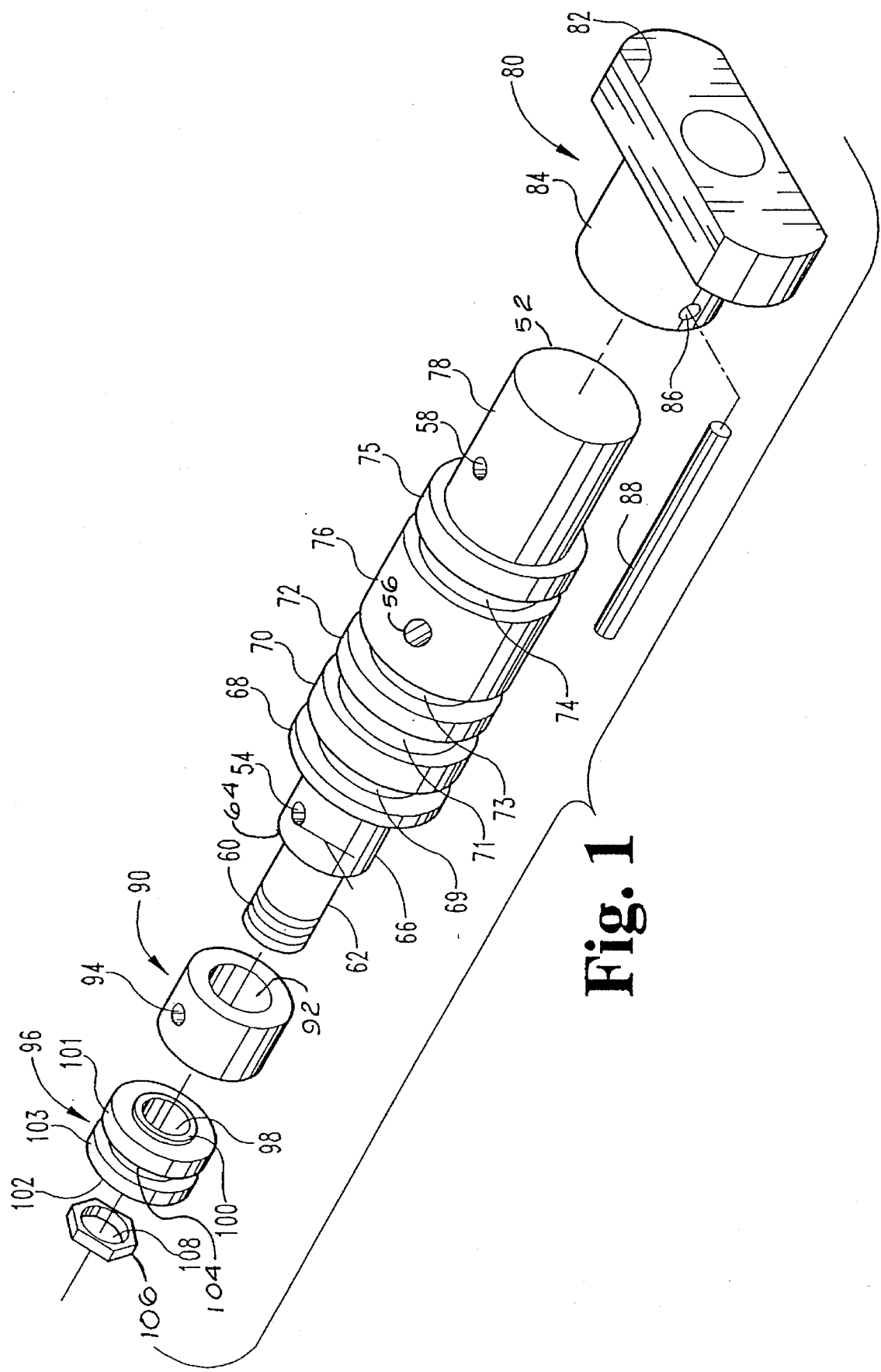
FIG. 1 is an exploded view of a spool valve and its various valve components, in accordance with the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1A:
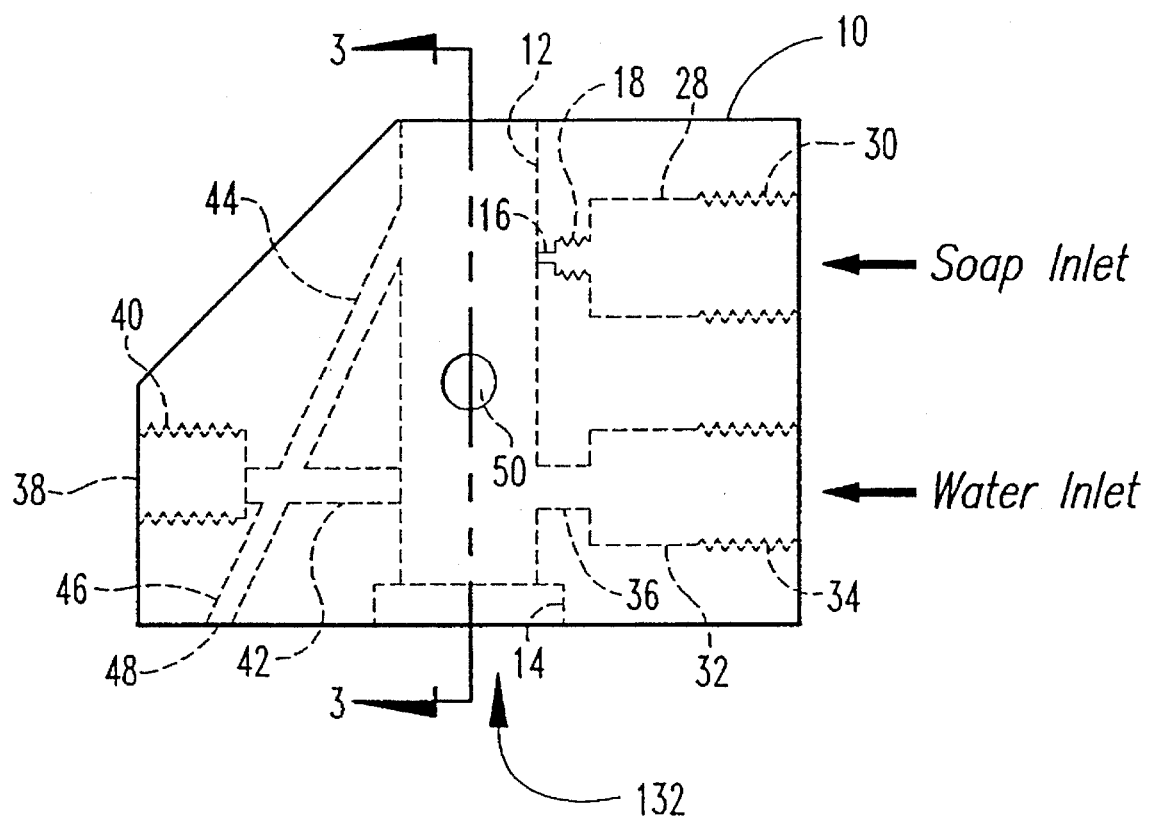
FIG. 1a is a left side plan view of a valve body in accordance with the present invention, showing internal fluid paths in phantom.

Referring to FIGS. 1 and 1a, the various components of valve system 5 are shown in accordance with the present invention.

Valve body 10 defines a bore 12 therethrough having a predetermined bore diameter. One end of bore 12 terminates at the top surface of body 10 and the other end terminates at one end of a second bore 14 having a bore diameter larger than that of bore 12. The opposite end of bore 14 terminates at the bottom surface of body 10.

Figure 3:
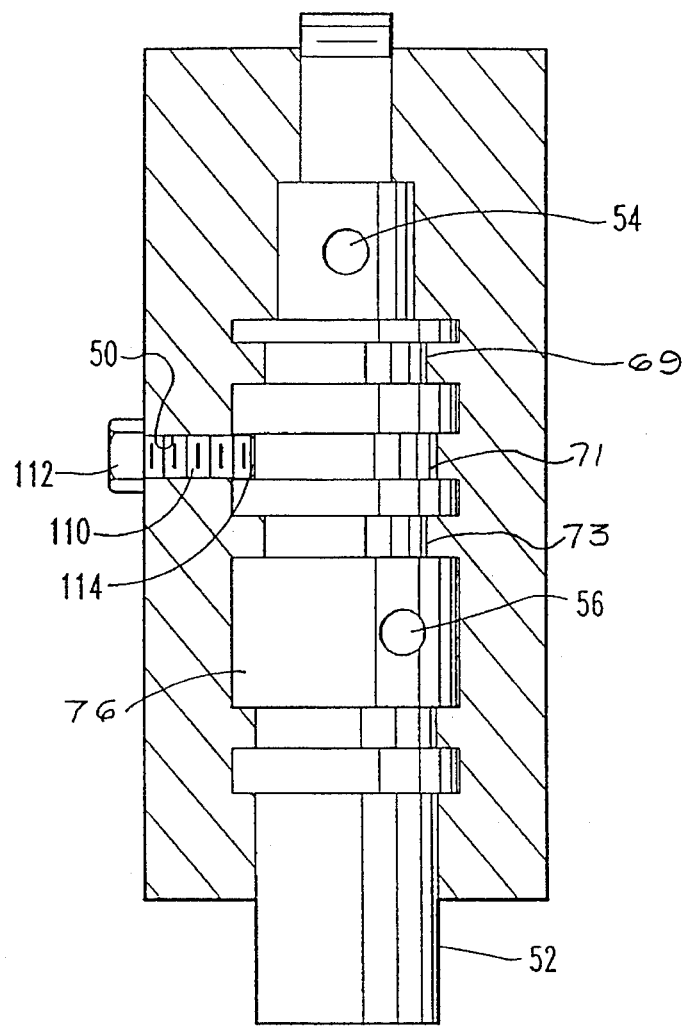
FIG. 3 is a rear cross-sectional view, along lines 3—3 of the valve body shown in FIG. 1a, wherein a mechanism for restraining translational movement of a spool valve disposed within the valve body is shown.

Body 10 further defines a first inlet passage 28 having a threaded portion 30 at one end for connecting to a source of soap solution (not shown). In one embodiment, soap solution is supplied at between approximately 1200 and 1400 psi. At the opposite end of the first inlet passage 28 body 10 defines a second threaded passage 18 for receiving a complementarily threaded flow restricting device 20 (FIG. 3). Threaded passage 18 is open to bore 12 via passage 16 disposed generally perpendicular to bore 12.

Figure 2:
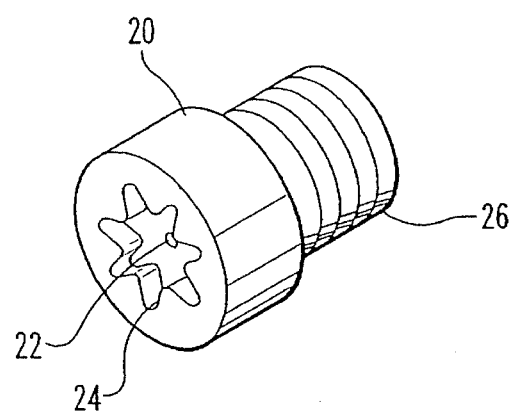
FIG. 2 is a perspective view of a flow restricting device for use in the valve system of the present invention.

Referring now to FIG. 2, flow restricting device 20 has a threaded portion 26 and a flow restricting bore 22 disposed therethrough for reducing the flow rate of fluid from inlet passage 28 to passage 16. In one embodiment, device 20 is a screw made from, for example 316 S/S, and having a torques-type head 24 with a bore 22 approximately 0.052 inches in diameter extending axially from the center of the torques receptacle 24 to the end of the screw. It is to be appreciated, however, that the flow restricting device 20 of the present invention is not restricted to a single bore diameter and other flow restriction rates are contemplated.

Referring back to FIGS. 1 and 1a, body 10 also defines a second inlet passage 32 having a threaded portion 34 at one end for connecting to a source of water (not shown). In one embodiment, water is supplied at approximately 2000 psi. The opposite end of the second inlet passage 32 is open to bore 12 via passage 36 disposed generally perpendicular to bore 12. In one embodiment, the first and second inlet passages 28 and 32 are sized, and threaded portions 30 and 34 are configured, for receiving a complementarily threaded ⅜ inch pipe, and passage 18 is configured to receive the threaded portion 26 of a ¼ inch 28 tpi flow restricting device 20.

Body 10 further defines an outlet passage having a threaded portion 40 for connecting, in one embodiment, to a ⅜ inch complementarily threaded pipe. Outlet passage 38 is open to bore 12 via passage 42 disposed generally perpendicular to bore 12 and directly opposite to and facing a third passage 36. The third passage 42 is further open to bore 12 via passage 44 disposed at an acute angle relative to the longitudinal axis of bore 12. The third passage 42 is also open to passage 46 which is a continuance of a fourth passage 44 toward the bottom of body 10. Passage 46 is non-functional with respect to the operation of valve system 5 and exists only to provide a path for drilling passage 44 during manufacture of body 10. In fact, after the fourth passage 44 is formed, passage 46 is typically closed at opening 48 by welding or any other equivalent method of forming a leak-proof seal.

Finally, body 10 defines a threaded hole 50 extending through the side of body 10 and into bore 12 for receiving retaining screw 110 (FIG. 3). In one embodiment, hole 50 is configured to receive a ¼ inch 28 tpi retaining screw 110.

Body 10 is preferably of uniform construction and made from, for example, a material such as 304 S/S.

Elongated valve member 52 is intended by the present invention to be received within bore 12 as shown by arrow 132 in FIG. 1a, for directing the flow of soap solution and water, in varying proportions, to outlet 38. To this end, valve 52 includes a cylindrical portion 66 having a bore 54 extending therethrough perpendicular to the longitudinal axis of valve 52. A sealing sleeve 90 has a pair of perpendicularly intersecting bores, 92 and 94, extending therethrough, wherein bore 92 is sized slightly smaller than the diameter of cylindrical portion 66 so that sleeve 90 may be forcibly retained on valve 52 by stretching bore 92 over cylindrical portion 66. Bore 94 is configured within sleeve 90 to allow substantial alignment of bores 94 and 54 when sleeve 90 is stretched over cylindrical portion 66. In order ho allow such stretching, sleeve 90 is required to be somewhat elastic and is preferably made of TEFLON®.

Figure 5:
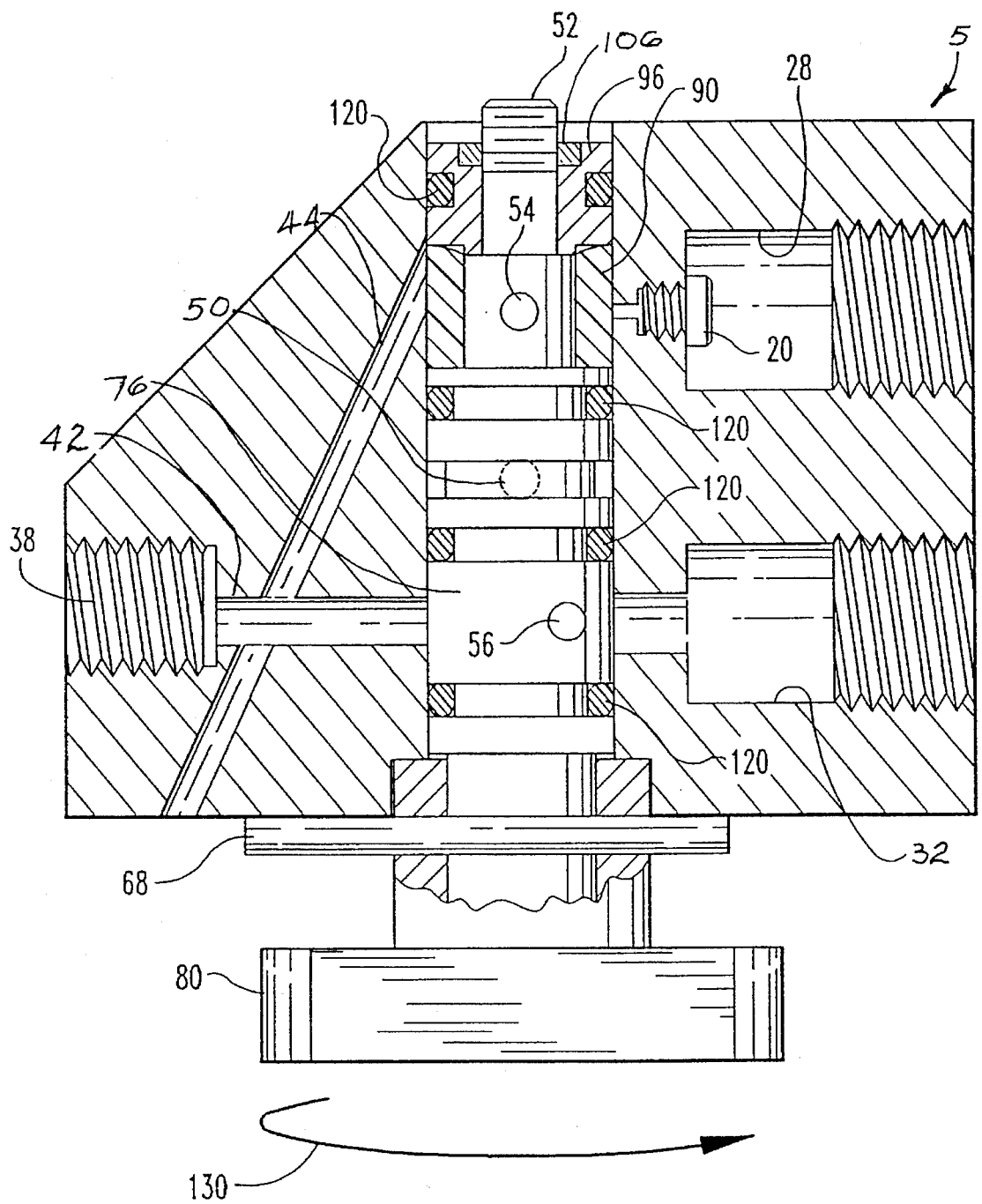
FIG. 5 is a cross-sectional view of the valve body of FIG. 1a with the valve assembly of FIG. 1 disposed therein.

Valve 52 further includes a cylindrical portion 62 adjacent to one end of cylindrical portion 66 for receiving seal carrier 96. Seal carrier 96 has a bore 98 sized to receive cylindrical portion 62 therethrough. At one end of bore 98, seal carrier 96 defines a boss 100 sized to contact a surface 64 of cylindrical portion 66. This action serves to compress sleeve 90, thereby pressing it against the walls of bore 12 when valve 52 is disposed therein. At the other end of bore 98, seal carrier 96 defines a recess sized to house a nut 106 disposed therein. A threaded portion 60 of cylindrical portion 62 defines one end of valve 52 and is configured to engage the complementarily threaded bore 108 of nut 106. Thus, when sleeve 90 is stretched onto cylindrical portion 66, and seal carrier 96 is loaded onto cylindrical portion 62 via bore 98, the threaded portion 108 of nut 106 engages the threaded portion 60 of valve 52 to thereby compress sleeve 90. Seal carrier 96 further defines a channel 104 disposed radially about bore 98 and positioned between cylindrical spools 101 and 103, also defined by seal carrier 96, for retaining a fluid seal ring 120 (FIG. 5).

Valve 52 further defines a series of consecutive cylindrical spools 68, 70, 72, 76 and 75 respectively adjacent to the end of cylindrical portion 66 opposite cylindrical portion 62, Cylindrical channels 69, 71, 73 and 74 are further defined by valve 52 and are respectively disposed between the spools 68, 70, 72, 76 and 75. Channels 69, 73 and 74 are configured identically to channel 104 for retaining a fluid seal ring 120 (FIG. 5). Channel 71, on the other hand, is configured to receive the tip 114 of a set screw 110 engaged with threaded bore 50 as shown in FIG. 3.

Referring to FIG. 3, set screw 110 is provided for restraining translational motion of the valve 52 after it is received within bore 12. The head of set screw 110 is preferably a 12 point bolt head. Set screw 110 must be long enough to extend through the valve body 10 and allow the tip 114 to bear against either the surface of cylindrical channel 71 or the two opposing faces of cylindrical spools 70 and 72.

As shown in FIGS. 1 and 3, cylindrical spool 76 defines a bore 56 extending through valve 52 perpendicular to its longitudinal axis. Bore 56 is sized identically to bore 54, with both bores 54 and 56 being preferably ⅛ inch in diameter. However, as is most clearly seen in FIG. 3, bore 56 is radially offset from bore 54. In one embodiment, the angle of offset is approximately 30 degrees.

Referring back to FIGS. 1 and 1a, the remaining end of valve 52 is defined by a cylindrical portion 78 adjacent spool 75. Cylindrical portion 78 is configured to receive a comparably sized bore (not shown) on adjustment handle 80. An outer cylindrical portion 84 of handle 80 is sized to be received within bore 14 with a predetermined loose fit so that cylindrical portion 84 may be freely rotated within bore 14. A bore 86 extends through cylindrical portion 84 perpendicular to its longitudinal axis and a pin 88 is provided which extends through bore 86 and bore 58, when handle 80 is fitted over cylindrical portion 78, thereby locking handle 80 to valve 52. Handle 80 further includes a gripping portion 82 for manually adjusting valve 52.

Spools 68, 70, 72, 76, 75, 101 and 103 are generally sized identically to each other and are slidably received within bore 12 when the valve 52, handle 80, sleeve 90, seal carrier 96 and nut 106 construct is disposed within bores 12 and 14.

Figure 4:
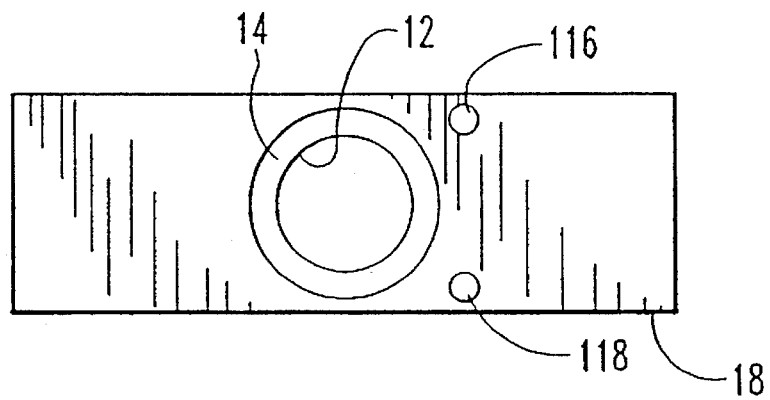

Referring to FIG. 4, the bottom of valve body 10 includes stops 116 and 118 for restraining rotational motion of valve 52 disposed within bore 12 when valve system 5 is constructed from the various components shown in FIG. 1, the pin 88 is longer than the outer diameter of cylindrical portion 84 and should extend between the stops 116 and 118. Because pin 88 is secured to handle 80 and valve 52, stops 116 and 118 only allow rotational motion of the valve 52 within bore 12 to the extent that pin 88 is free to move between stops 116 and 118.

Referring to FIG. 5, the operation of valve system 5 will now be described. With the spool valve assembly of FIG. 1 inserted into bore 12 as previously described, bore 54 is positioned at the same longitudinal position as the radially inner ends of passage 16, and fourth passage 44. Similarly, bore 56 is positioned at the same longitudinal position as the radially inner ends of passages 36 and 42. Fluid seal rings 120 have been positioned within channels 69, 73, 74 and 104 as previously described to retain soap solution in the vicinity of bore 54 and water in the vicinity of bore 56, thereby preventing commingling of the two fluid sources within bore 12 and further preventing leakage of the two fluids out of bore 12 arid valve body 10. Fluid seal rings 120 must be capable of forming an acceptable fluid seal and must further be resistant to chemicals such as detergents and solvents that may be present in the soap solution. In one embodiment, the fluid seal rings 120 are VITON® "O" rings.

Since bore 54 is radially offset with respect to bore 56 as previously described, rotational movement of valve 52 via handle 80 will result in differing proportional mixtures of soap solution and water emerging from outlet passage 38. When handle 80 is positioned such that bore 56 is axially aligned with passages 36 and 42, so that bore 56, passage 36, and third passage 42 are disposed coaxially, water entering second inlet passage 32 flows through second inlet passage 32, bore 56, third passage 42 and through outlet passage 38. Because bore 54 is offset with respect to bore 56, soap solution entering passage 16 does not flow through bore 56, but is instead sealed from bore 12 via sleeve 90. With valve 52 so positioned, the mixture emerging from outlet passage 38 comprises approximately 100% water and 0% soap solution.

As handle 80 is rotated in the direction of arrow 130, bore 56 begins-to move out of axial alignment with passages 36 and 42, thereby decreasing the flow of water into outlet 38. At the same time, bore 54 begins to move closer toward axial alignment with passages 16 and 44. As used herein, bore 54 is in "axial alignment" with passages 16 and 44 when one end of the bore 54 is disposed adjacent to the radially inner end of passage 16, and the other end of the bore 54 is disposed adjacent to the radially inner end of passage 44. As bore 54 moves closer toward axial alignment, some soap solution passes through inlet passage 28, flow control device 20, passage 16, bore 56 and into diagonal fourth passage 44. The water flowing through third passage 42 and into outlet passage 38 then draws the soap solution from fourth passage 44 and mixes the two fluids in venturi-like fashion to provide a mixture emerging from outlet passage 38 comprising somewhat less 100% water and somewhat more than 0% soap solution.

As handle 80 continues to rotate in the direction of arrow 130, a position is reached wherein the amount of soap solution flowing through bore 54 and into fourth passage 44 is equal to the amount of water flowing through bore 56 and into third passage 42. This conditions thus provides for a mixture emerging from outlet passage 38 of approximately 50% soap solution and 50% water. It can be appreciated that because the water pressure at the water inlet (second) passage is greater than the soap solution pressure at inlet passage 28, there exists the possibility that water may back flow through passage 44, bore 54, passage 16, flow control device 20, first inlet passage 24 and into the source of soap solution (not shown). To avoid possible contamination of the soap solution source, a check ball valve (not shown), or similar mechanism, may be installed within inlet chamber 28 so that back flow of water into the soap solution source can be inhibited. In situations where soap solution may back flow into the water source, a check ball valve, or similar mechanism, may also be installed within inlet chamber 32 to inhibit such back flow.

As handle 80 continues to rotate in the direction of arrow 130, a position will be reached wherein bore 54 will be axially aligned with passages 16 and 44, and bore 56, because of its offset with respect to bore 54, will not be in fluid communication with either passage 36 or passage 42. This condition thus results in a mixture emerging from outlet passage 38 of approximately 0% water and 100% soap solution. In one embodiment, some water flowing into second inlet passage 32 will flow into outlet passage 38 via third passage 42 because the diameter of cylindrical portion 76 is sized to be slightly less than the diameter of bore 12 to allow valve 52 to be slidably received therein. Some water will thus be able to flow around cylindrical portion 76 and into third passage 42 thereby decreasing the proportion of mixture emerging from outlet passage 38 to somewhat more than 0% water and somewhat less than 100% soap solution. However, the present invention contemplates the engagement of a sleeve, such as sleeve 90, to cylindrical portion 76 to thereby inhibit the flow of water into third passage 48 when fluid communication from passage 36 to third passage 42 through bore 56 is disallowed.

From the foregoing, it can be appreciated that the valve system 5 of the present invention allows continuous analog control of the proportional quantities of soap solution and water emerging from outlet passage 38 from approximately 0% water, 100% soap solution, to 100% waiter, 0% soap solution. Two mechanisms inherent in the design of valve system 5 also make it possible to operate multiple identical valve systems from a common soap solution source and common water source without adversely affecting the fluid pressure required by each user. First, flow reducing device 20 significantly reduces the flow rate of soap solution entering passage 16 from that entering inlet passage 28. Similarly, the size of bore 56 significantly reduces the flow rate of water entering third passage 42 from that entering first inlet passage 32. This mechanism results in allowing a user to operate valve system 5 within the aforementioned extremes while maintaining essentially constant fluid pressures at the first and second inlet passages 28 and 32. Second, the maximum flow rate of fluid through either bore 54 or 56 occurs only when the bore is axially aligned with its respective fluid communication passages. In other words, the maximum flow rate of water through bore 56 occurs only when bore 56 is axially aligned with passages 36 and 42, and the maximum flow rate of soap solution through bore 54 occurs only when bore 54 is axially aligned with passages 16 and 44. Thus, as valve 52 is rotated so that either bore 54 or 56 is moved away from axial alignment with its respective passages, the flow rate of fluid therethrough is diminished. This then results in less fluid demand from the respective fluid source and further acts to maintain constant fluid pressures at inlet passages 28 and 32.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A valve system for combining two liquids in varying proportions, said valve comprising:

a valve body;

a first inlet passage defined in said body for receiving a first fluid at a first predetermined pressure, the first inlet passage including a flow restricting device for reducing the flow rate of fluid therethrough;

a second inlet passage defined in said body for receiving a second fluid at a second predetermined pressure;

an outlet passage defined in said body for providing a proportional mixture of said first fluid and said second fluid;

valve means disposed within said body for directing said first fluid and said second fluid toward said outlet passage, said valve means being adjustable to permit said proportion of said mixture to range, in analog fashion, from between about 0% said first fluid, 100% said second fluid to about 100% said first fluid, 0% said second fluids.

2. The valve system of claim 1 wherein said flow restricting device includes a screw having a bore of a predetermined diameter extending therethrough.

3. The valve system of claim 2 wherein said predetermined bore diameter is approximately 0.052 inches.

4. The valve system of claim 1 wherein said first fluid includes a liquid soap concentrate and said second fluid includes water.

5. The valve system of claim 4 wherein said first predetermined pressure ranges between approximately 1200 and 1400 psi, and said second predetermined pressure is approximately 2000 psi.

6. The valve system of claim 1 further comprising:

a third passage disposed between said valve and said outlet passage, said third passage being in fluid communication with said outlet passage; and a fourth passage disposed between said valve and said third passage, said fourth passage being in fluid communication with said third passage, said fourth passage directing said first fluid toward said third passage, and said third passage directing said first and second fluids toward said outlet opening.

7. A valve system for combining two fluids in varying proportions, said valve comprising:

a valve body having a first bore extending therethrough;

a first inlet passage defined in said body for receiving a first fluid, said first inlet passage being in fluid communication with said first bore;

a second inlet passage defined in said body for receiving a second fluid, said second inlet passage being in fluid communication with said first bore;

an outlet passage defined in said body for providing a proportional mixture of said first fluid and said second fluid, said outlet passage being in fluid communication with said bore;

a generally cylindrical valve disposed within said first bore for directing said first fluid and said second fluid toward said outlet passage in varying proportions, said valve being rotatably adjustable within said first bore to permit variable proportions of said first and second fluids to flow through said outlet passage;

a third passage disposed between said valve and said outlet passage, said third passage being in fluid communication with said outlet passage; and a fourth passage disposed between said valve and said third passage, said fourth passage being in fluid communication with said third passage, said fourth passage directing said first fluid toward said third passage, and said third passage directing said first and second fluids toward said outlet passage, the fourth passage being disposed at a relatively acute angle to the third passage and at a relatively obtuse angle to the outlet passage to foster the drawing of the first fluid into the outlet passage wherein said second fluid flowing in said third passage draws said first fluid from said fourth passage in venturi-like fashion to provide a mixture thereof to said outlet passage, and wherein said first inlet passage receives said first fluid at a first predetermined pressure and said second inlet passage receives said second fluid at a second predetermined pressure, said system further including:

a flow restricting device disposed within said first inlet passage for restricting the flow of fluid therethrough.

8. The valve system of claim 7 wherein said valve includes second and third bores extending therethrough, said second bore being positioned at the same longitudinal position as said first inlet passage, said third bore being positioned at the same longitudinal position as said second inlet passage, said second and third bores being radially offset from each other by a predetermined angle, wherein adjustably rotating said valve permits a variable quantity of said first fluid to flow through said second bore toward said outlet passage, and a variable quantity of said second fluid to flow through said third bore toward said outlet passage, said variable quantities depending on the degree of axial alignment of said second bore with said first inlet passage and of said third bore with said second inlet passage.

9. The valve system of claim 8 wherein said predetermined angle is approximately 30 degrees.

10. The valve system of claim 7 wherein said flow restricting device includes a screw having a fifth bore of a predetermined diameter extending therethrough.

11. The valve system of claim 10 wherein said fifth bore diameter is approximately 0.052 inches.

12. The valve system of claim 7 wherein said first fluid includes a liquid soap concentrate and said second fluid includes water.

13. The valve system of claim 12 wherein said first predetermined pressure ranges between approximately 1200 and 1400 psi and said second predetermined pressure is approximately 2000 psi.

14. The valve system of claim 7 wherein said valve includes a third bore extending therethrough, said third bore being positioned at the same longitudinal position as said second inlet passage, wherein adjustably rotating said valve permits a variable quantity of said second fluid to flow through said third bore toward said outlet passage, said variable quantity depending on the degree of axial alignment of said third bore with said second inlet passage.

* * * * *